Oct. 19, 1926.
C. T. BURKE
1,603,743
NUT CASTELLATING MACHINE
Filed May 12, 1924
4 Sheets-Sheet 4
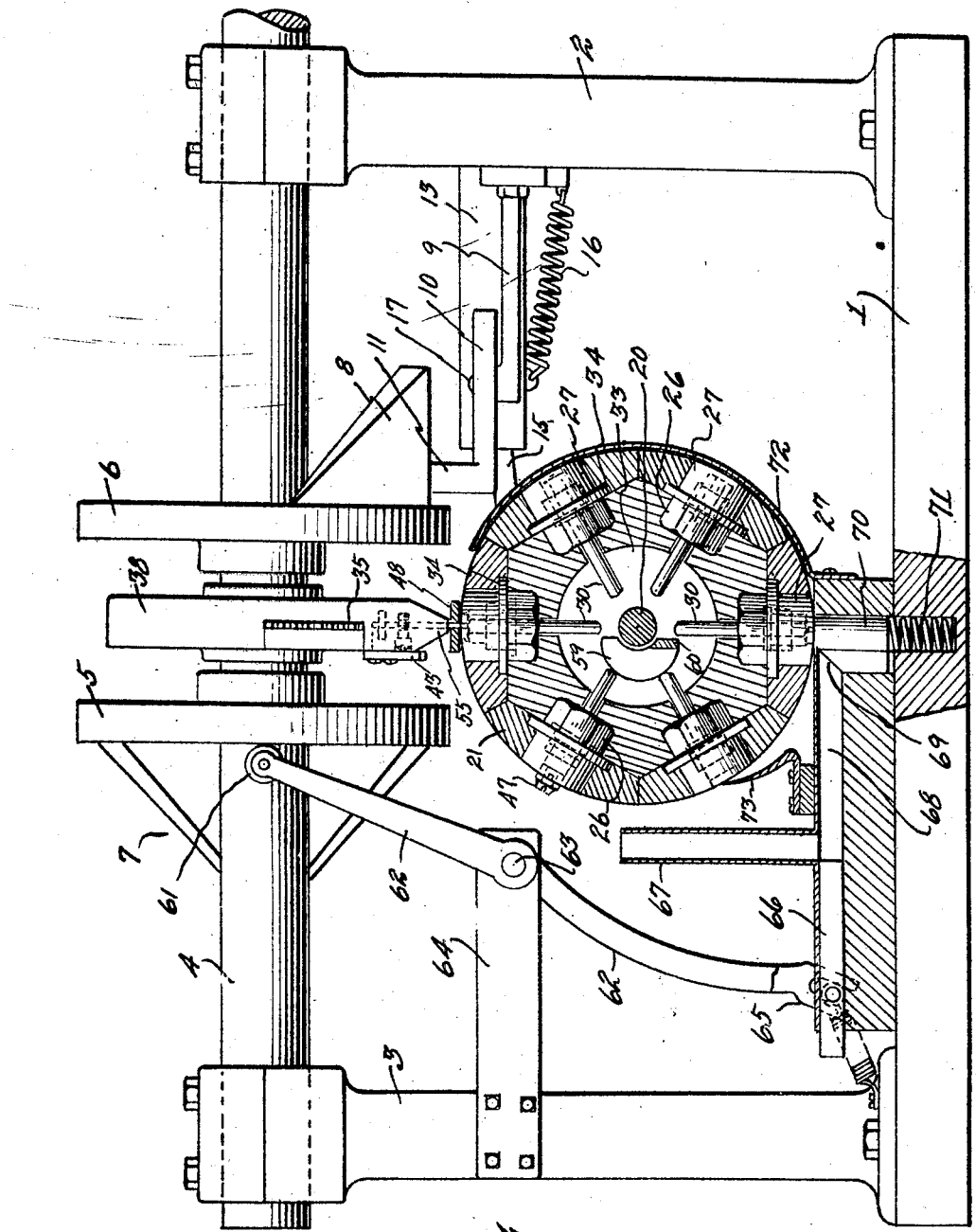
INVENTOR.
Charles T. Burke
BY
Charles E. Wismer
ATTORNEY.

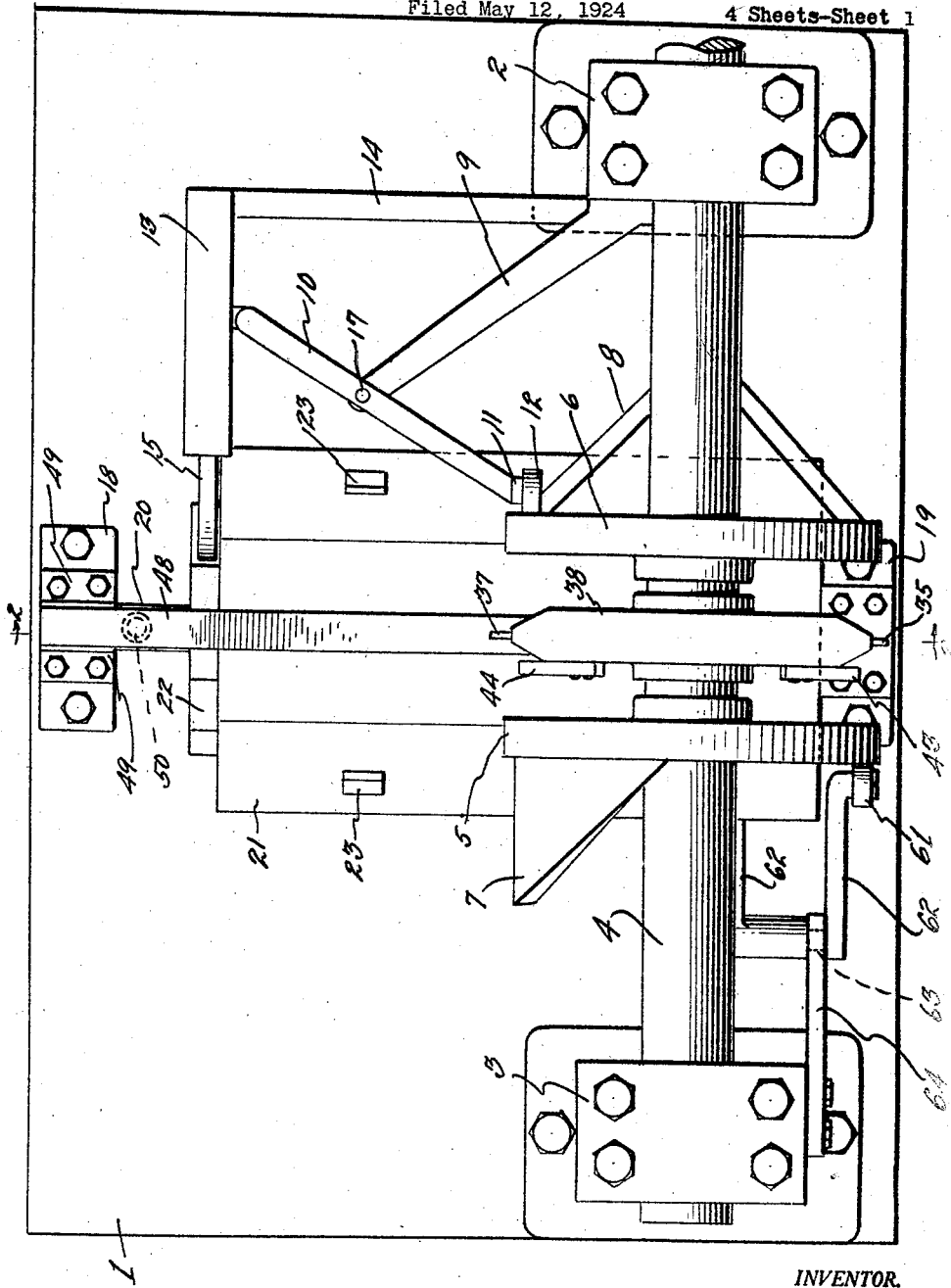

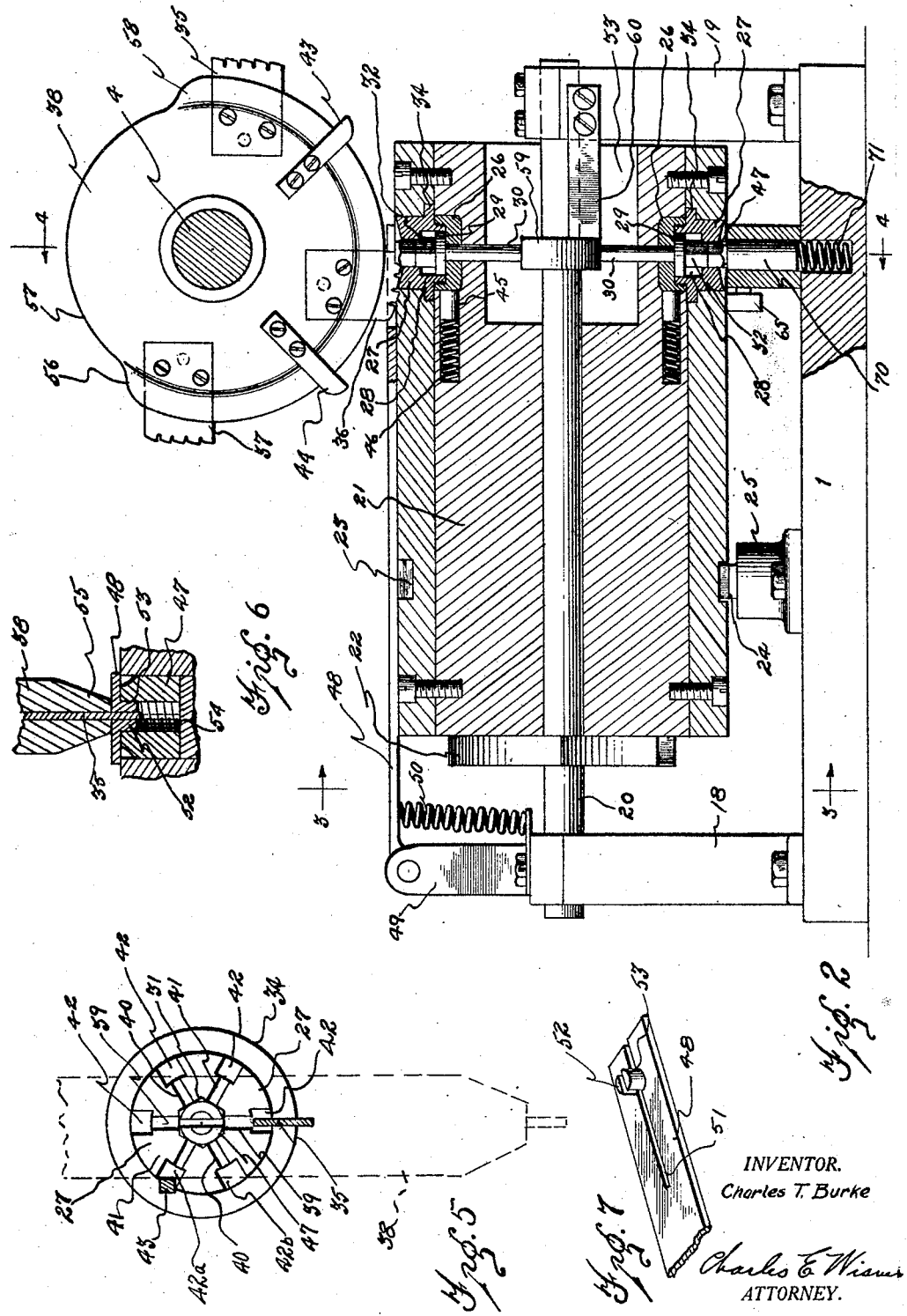

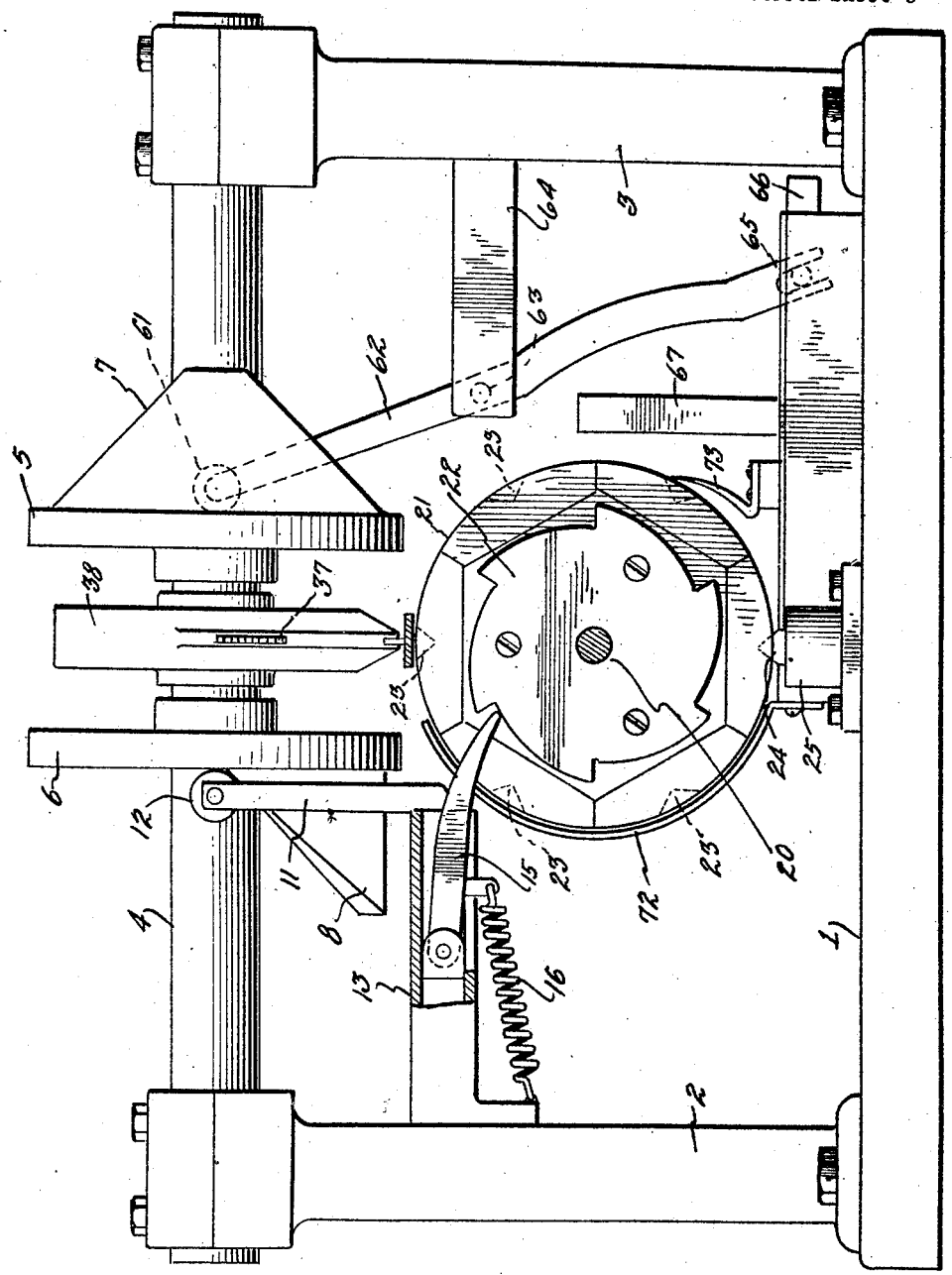

Patented Oct. 19, 1926.

1,603,743

UNITED STATES PATENT OFFICE.

CHARLES T. BURKE, OF DETROIT, MICHIGAN, ASSIGNOR OF ONE-TENTH TO CHARLES E. WISNER, TWENTY PER CENT TO RAYMOND J. MILROY, TWENTY PER CENT TO WILLIAM J. TURNER, AND TWENTY PER CENT TO RICHARD M. WATSON, ALL OF DETROIT, MICHIGAN.

NUT-CASTELLATING MACHINE.

Application filed May 12, 1924. Serial No. 712,613.

This invention relates to nut castellating machines and the object of the invention is to provide a machine in which nuts may be automatically castellated, the nuts being fed into the machine at one point and after being castellated are automatically discharged from the machine.

Another object of the invention is to provide a machine in which the nuts are carried on the surface of a drum, the drum being indexed to bring the nuts to position beneath the slotting device and the nuts being indexed for the different slotting cuts before the drum is again indexed.

A further object of the invention is to provide a nut castellating machine in which the nuts are automatically fed into the machine as required, are brought to position beneath the slotting device and indexed for slotting and the completed nuts are then discharged from the machine.

Another object of the invention is to provide a nut castellating machine comprising a drum in which a series of nut holders are mounted the nuts being automatically fed into the holders and carried around to the slotting device where they are indexed prior to each slotting operation, and upon further rotation of the drum are automatically discharged from the holders.

A further object of the invention is to provide a nut castellating machine in which the nuts are slotted diametrically of the central aperture therethrough so that the slots therein will align with the diametric aperture through the stud on which the nut is used.

Another object of the invention is to provide a machine in which the nuts are held from chattering or turning during the slotting operation and are also held from longitudinal or sidewise movement.

These objects and the several novel features of the invention are hereinafter more fully described and claimed and the preferred form of construction by which these objects are attained is shown in the accompanying drawings in which—

Fig. 1 is a plan view of a nut castellating machine embodying my invention.

Fig. 2 is a section taken on line 2—2 of Fig. 1.

Fig. 3 is a section taken on line 3—3 of Fig. 2.

Fig. 4 is a section taken on line 4—4 of Fig. 2.

Fig. 5 is an enlarged plan view of one of the nut holders.

Fig. 6 is a section through the nut during the slotting operation.

Fig. 7 is a perspective view of the under side of the slotting guide.

As shown in Fig. 1 the machine comprises a base 1 having standards 2 and 3 mounted thereon which at the upper end are provided with bearings for the shaft 4. The shaft 4 is adapted to be driven in any suitable manner and is provided with cam plates 5 and 6 having cam portions 7 and 8 formed integrally therewith. An extending bracket 9 is provided on the standard 2 and a lever 10 is pivotally mounted on this bracket and is provided with an upwardly extending portion 11 on which a roller 12 is rotatably mounted and is adapted to ride on the face of the plate 6 and cam portion 8 as shown in Figs. 1, 3 and 4. The opposite end of this lever 10 extends through a casing 13 supported by means of the arm 14 on the bracket 2 as shown in Figs. 1 and 3 and is connected to a pawl 15 which is slidably mounted in the casing 13 and is adapted to be normally retracted into the casing by means of the spring 16, the arrangement being such that as the roller rides up the cam portion 8 the arm 10 is turned on the pivot 17 in the end of the bracket 9 to eject the pawl 15 against the tension of the spring 16 as will be understood from Figs. 1 and 3. As shown in Fig. 2 a pair of standards 18 and 19 are mounted on the base 1 and provide bearings for the shaft 20 which extends at a right angle to the shaft 4. Secured to the shaft 20 is a drum 21 having a ratchet 22 secured to the end thereof, shown more particularly in Fig. 3, in which the pawl 15 is adapted to engage. A series of V shaped notches 23 are provided in the surface of the drum 21 and a spring pressed catch 24 is adapted to engage in the notches 23, the casing 25 for the catch 24 being mounted on the base 1 as shown in Figs. 2 and 3. Upon each actuation of the pawl 15 the drum is turned so that the succeeding notch 23 is positioned over the spring pressed catch 24 and thus the drum is held from moving after each actuation of the pawl. As will be seen from Figs. 2, 4 and 5 a series of six holders are provided which will accommodate six nuts in the circumference of the drum. These holders each comprise a nut like portion 26 which is provided with six sides as shown in Fig. 4 and is threaded onto the inner end of the portion 27 of the holders. The portion 27 is provided with a recess 28 in which the flange 29 of a plunger 30 is movable and the portion 27 is provided with an hexagonal opening 31 shown in Fig. 5 in which the nuts are adapted to be mounted. The plunger 30 at the upper end is provided with an hexagonal portion fitting in the lower portion of the aperture 31 and supporting the nut thereon and the plunger 30 extends through an aperture provided in the cap 26 and extends into the recess 33 in the end of the drum 21. This holder is rotatably mounted in the drum and is provided with a flange 34 preventing longitudinal movement of the holder. The cutters 35, 36 and 37 are mounted in slots provided therefor in the member 38 which is secured to the shaft 4 as shown in Figs. 2, 3 and 4. These cutters are provided with a series of teeth each adapted to take a deeper cut in the nut than the preceding tooth so that when the last tooth passes through the nut the slot is of the required depth. It will be noted from Fig. 5 that the member 27 is provided with three arcuate slots 39, 40 and 41 which extend diametrically across the member 27 and provide a space through which the cutters 35, 36 and 37 are adapted to pass in slotting the nut. The member 27 is provided with a series of six notches 42 in the periphery thereof of greater depth than the slots 39, 40 and 41 and the members 43 and 44 are attached to the outside of the member 38 and are adapted to engage in these notches so that as the cutter 35 moves out of the slot 39 as shown in Fig. 2 the member 43 engages in the exposed notch 42ª at the side of the member 38 and moves it to the position 42ᵇ before passing out of the respective notch. As will be seen from Fig. 2 a flat faced plunger 45 is engaged against the flat hexagonal facing of the member 26 and is held in engagement with the respective face by the spring 46 so that each time the member 27 is indexed it is held squarely in position beneath the cutter by the member 45 and spring 46. As the member 27 is turned by the member 43 the slot 40 is positioned at the point occupied by the slot 39 in Fig. 5 at which time the cutter 36 cuts a slot across the nut 47 and the member 44 again turns the member 27 so that the cutter 37 may pass through the slot 41 and make the final slot in the nut. It will be noted from Figs. 1 and 2 that a thin metal arm 48 is pivotally mounted in the brackets 49 mounted on the standard 18 and is adapted to be forced upwardly on its pivot by the compression coiled spring 50. At the end as shown in Fig. 7, which is a perspective view of the under side of the arm 48, the arm 48 is provided with a slot 51 through which the cutters 35, 36 and 37 are adapted to pass and a pair of half round lugs 52 and 53 are provided on the under side of the arm 48 and are adapted to engage in the central aperture 54 of the nut 47 as shown in Fig. 6. The rib 55 of the member 38 engages on the arm 48 on opposite sides of the slot 51 and holds the lugs 52 and 53 in position in the nut in order to center the aperture of the nut in relation to the cutter blades and prevent the nut from chattering during slotting and by this arrangement the resultant slots extend diametrically across the aperture of the nut. This arm 48 and lugs 52 and 53 remain in the position shown in Fig. 6 during each indexing or subsequent slotting, the nut being turned about the lugs 52 and 53 as will be readily understood. At the completion of the operation the end of the arm 48 due to its tendency to rise by the spring 50 rides up on the cam face 56 of the member 38 and onto the face 57 thereof, the lugs 52 and 53 being completely raised out of the nut at this time and the arm 48 moving up out of engagement with the face of the drum by means of the spring 50. At this time the portion 8 of the cam plate 6 passes beneath the roller 12 and turns the lever 10 on the pivot 17 as will be understood from Fig. 1 and turns the drum a sixth of a turn until the spring catch 24 shown in Fig. 3 engages in the succeeding notch 23. At this time a new nut to be slotted is positioned beneath the cutter and the cam face 58 of the member 38 again forces the arm 48 downwardly to the position shown in Fig. 2 with the lugs 52 and 53 engaging in the aperture of the nut, at which time the nut will be slotted and indexed, slotted again and indexed until the cutter 37 makes the final slot. As the drum is rotated by means of the pawl 15 the end of the plunger 13 beneath the completed nut rides up on the face of the cam 59 which is mounted in the recess 33 of the drum on the bracket 60 as will be understood from Figs. 2 and 4. As this plunger moves upwardly the portion 32 thereof forces the nut out of the holder as will be seen from Fig. 4, the rotation of the drum in this view being in a counter-clockwise direction. After the succeeding nut has been moved to the position the portion 7 of the cam plate 5 passes beneath the roller 61 on the lever 62 which is pivotally mounted at 63 on a bracket 64 secured to the standard 3 as will be seen from Fig. 4. As this is done the lever 62 is turned on the pivot 63 and by means of the forked end 65 thereof it moves the plunger 66 to the right of Fig. 4 so that the nuts which are stacked upside down in the stack 67 are moved through the channel 68 as they are moved onto the inclined face of the plunger 70 the nut depresses the said plunger against the tension of the spring 71 until the nut is positioned on top of the plunger 70 at which time the spring 71 forces the plunger 70 upwardly and positions the nut in the respective holder 27, the nut forcing the plunger 30 upwardly at this time after it has passed off from the cam 59. As the drum is rotated in a counter-clockwise direction in Fig. 4 the nuts are prevented from falling out of the holders by the arcuate guard 72 so that each holder passes up to the cutter with a nut correctly positioned therein, the operation of the lever 62 taking place after each indexing of the drum. It will thus be seen that the nuts are positioned in the holders and are carried up to position beneath the cutter and are slotted three times before being discharged from the holders and a nut is completely slotted upon each complete revolution of the member 38 at which time the drum is indexed a sixth of a turn. As shown in Figs. 3 and 4 a steel spring scraper 73 rides in contact with the drum and scrapes off any metal cuttings deposited on the face of the drum by the cutters. It will thus be seen that the nuts are castellated very rapidly with this machine and that the machine is entirely automatic as long as a supply of nuts is maintained in the stack 67.

From the foregoing description it becomes evident that the device is very simple and efficient in operation, will not easily get out of order, is entirely automatic in operation, is composed of few parts and is of consequent low manufacturing cost and provides a device which accomplishes the objects described.

Having thus fully described my invention, its utility and mode of operation, what I claim and desire to secure by Letters Patent of the United States is—

1. In a nut castellating machine, a base, a cylindrical drum rotatably mounted thereon, a series of nut holders rotatably mounted in the surface of the drum, a ratchet secured to the end of the drum, a pawl for engaging the ratchet, a shaft rotatably mounted above the drum, means for rotating the said shaft, a cam on the shaft, a pivoted lever actuated by the cam and connected to operate the pawl upon each complete revolution of the shaft, a second cam secured to the shaft, a pivoted lever actuated by the second cam upon each complete rotation of the shaft to position the nuts in the holders in succession subsequent to each indexing of the drum by the pawl, yieldable means for holding the drum in position after each indexing, a circular member secured to the shaft, a series of three slotting cutters extending from the periphery of the circular member, the drum being indexed by the pawl to position the nut holders one at a time beneath the slotting cutters, means carried by the circular member for indexing the respective nut holder after passage of each slotting cutter therethrough, means preventing chattering of the nut in the holder during the slotting operation, and means for ejecting the nut from the holder upon subsequent indexing of the drum.

2. In a nut castellating machine, a base, a cylindrical drum rotatably mounted thereon, a series of nut holders rotatably mounted in the surface of the drum, a ratchet secured to the end of the drum, a pawl for engaging the ratchet, a shaft rotatably mounted above the drum, means for rotating the said shaft, a cam on the shaft, a pivoted lever actuated by the cam and connected to operate the pawl upon each complete revolution of the shaft, a second cam secured to the shaft, a pivoted lever actuated by the second cam upon each complete rotation of the shaft to position the nuts in the holders in succession subsequent to each indexing of the drum by the pawl, yieldable means for holding the drum in position after each indexing, a circular member secured to the shaft, a series of three slotting cutters extending from the periphery of the circular member, the drum being indexed by the pawl to position the nut holders one at a time beneath the slotting cutters, means carried by the circular member for indexing the nut holder after passage of each slotting cutter therethrough, and means for ejecting the nut from the holder upon subsequent indexing of the drum.

3. In a nut castellating machine, a rotatable drum, a series of nut holders rotatably mounted in the surface of the drum, a ratchet on the end of the drum, a pawl for engaging the ratchet, a shaft rotatably mounted above the drum, means for rotating the said shaft, a cam on the said shaft, a pivoted lever actuated by the cam and connected to operate the pawl upon each complete revolution of the shaft, a second cam on the shaft, a pivoted lever actuated by the second cam to position the nuts in the holders in succession subsequent to each indexing of the drum by the pawl, yieldable means for holding the drum in position after being indexed by the pawl, a slotting member secured to the said shaft, the drum being indexed by the pawl to position the nut holders beneath the slotting member in succession, and means for indexing the nut holders subsequent to each slotting operation.

4. In a nut castellating machine, a rotatable drum, a series of nut holders rotatably mounted in the surface of the drum, a ratchet on the end of the drum, a pawl for engaging the ratchet, a shaft rotatably mounted over the drum, a cam on the said shaft, a pivoted lever actuated by the cam and connected to operate the pawl upon each complete revolution of the shaft, a slotting member secured to the shaft, the pawl and ratchet mechanism being adapted to turn the drum to position the nut holders in succession beneath the slotting member, means carried by the slotting member for automatically indexing the nut holders subsequent to each slotting operation, the slotting and indexing operation of the nut being completed between the indexings of the drum by the pawl and ratchet mechanism.

5. In a nut castellating machine, a rotatable drum, a series of nut holders rotatably mounted in the surface of the drum, means for automatically positioning the nuts in succession in the holders, a member rotatably mounted above the drum, a series of cutters secured in spaced relation in the said member, means for indexing the drum to bring each nut holder to position beneath the rotatable member, means carried by the rotatable member for indexing the nut after the passage of each cutter therethrough, yieldable means holding the nut holder in position after each indexing operation, and means for ejecting the nut from the holder after the cutting operations.

6. In a nut castellating machine, a base, a slotting member rotatably mounted thereon, a drum rotatably mounted beneath the slotting member, a series of nut holders rotatably mounted in the surface of the drum, means for automatically positioning a series of nuts in the holders in succession, means for turning the drum to position the holders one at a time beneath the slotting member, means carried by the slotting member for automatically indexing the holders subsequent to each slotting operation, and means for ejecting the nut from the holder as it passes from position beneath the slotting member.

7. In a nut castellating machine, a rotatable drum, a series of nut holders rotatably mounted in the surface of the drum, means for automatically positioning the nuts in the holders, a member rotatably mounted above the drum, a series of cutters mounted therein, means for bringing each nut holder to position beneath the rotatable member, means carried by the rotatable member for indexing the nut holders and nuts after each cut, and means for ejecting the nut from the respective holder as the succeeding nut holder is moved to position beneath the rotatable member.

8. In a nut castellating machine, a base, a member rotatably mounted thereon, a series of cutters mounted in the said member in spaced relation, a drum rotatably mounted beneath the cutters, a series of nut holders rotatably mounted in the surface of the drum, means for automatically positioning the nuts in the said holders, means for turning the drum to position the holders one at a time beneath the cutters, and means for automatically indexing the holders subsequent to each cutting operation.

9. In a nut castellating machine, a base, a slotting member rotatably mounted on the base, a member rotatably mounted beneath the slotting member, a series of nut holders rotatably mounted in the surface of the said member, means for turning the member to position the holders one at a time beneath the slotting member, and means carried by the slotting member for automatically indexing the holders subsequent to each slotting operation.

10. In a nut castellating machine, a base, a slotting member rotatably mounted thereon, said slotting member consisting of a series of three spaced cutters, a member rotatably mounted beneath the slotting member, a series of nut holders circularly arranged thereon, each of said holders being rotatable on its axis, means for turning the rotatable member to position the holders one at a time beneath the slotting member, means on the slotting device for turning the holder on its axis after the first and after the second cutter has formed a slot therein.

11. In a nut castellating machine, a base, a member rotatably mounted thereon, a series of nut holders circularly arranged about the said member, each of said holders being rotatable on its axis and adapted to be turned with the rotatable member, means for turning the rotatable member to position the holders successively in position for the slotting operation, means for holding the said member stationary during the slotting operation, a slotting means for cutting a slot in the head of the nut, and means for rotating the holder to present the nut in different positions for successive slotting operations while the drum is held from rotation.

12. In a nut castellating machine, a base, a member rotatably mounted thereon, a series of nut holders circularly arranged about the said member, each of said holders being rotatable on its axis and adapted to be turned with the rotatable member, means for turning the rotatable member to position the holders successively in position for the slotting operation, means for holding the said member stationary during the slotting operation, a slotting means for cutting a slot in the head of the nut, means for rotating the holder to present the nut in different positions for successive slotting operations while the drum is held from rotation, and an automatic centering device having a part adapted to be introduced into the aperture of the nut to center the same during the cutting operation.

13. In a nut castellating machine, a base, a rotatable slotting member supported thereby, a rotatable drum, a series of nut holders rotatably mounted in the periphery of the drum, means for turning the drum to position the holders successively in operative relation with the slotting member, said slotting member having a series of cutters each adapted to form a slot diametrically across the end of the nut, and means carried by the said slotting member to automatically index each holder during the slotting operation.

14. In a nut castellating machine, a base, a rotatable slotting member supported thereby, said member including a series of three spaced cutters, a rotatable member, a series of nut holders thereon, means for turning the said rotatable member to position the holders successively in operative relation with the slotting member, the cutters on said member each being adapted to form a slot diametrically across the nut being operated on, and means carried by the slotting member adapted to engage the holder and index the same subsequent to formation of the first and second slots across the nut.

In testimony whereof I sign this specification.

CHARLES T. BURKE.